United States Patent
Izatt (10) Patent No.: US 9,448,056 B2
(45) Date of Patent: Sep. 20, 2016

(54) SYSTEM FOR FOURIER DOMAIN OPTICAL COHERENCE TOMOGRAPHY

(75) Inventor: Joseph A. Izatt, Raleigh, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 12/759,029

(22) Filed: Apr. 13, 2010

(65) Prior Publication Data

US 2010/0265511 A1 Oct. 21, 2010

Related U.S. Application Data

(62) Division of application No. 10/854,426, filed on May 27, 2004, now Pat. No. 7,697,145.

(60) Provisional application No. 60/473,457, filed on May 28, 2003.

(51) Int. Cl.
*G01B 9/02* (2006.01)

(52) U.S. Cl.
CPC ......... *G01B 9/02007* (2013.01); *G01B 9/0201* (2013.01); *G01B 9/02004* (2013.01); *G01B 9/02027* (2013.01); *G01B 9/02044* (2013.01); *G01B 9/02079* (2013.01); *G01B 9/02081* (2013.01); *G01B 9/02091* (2013.01); *G01B 2290/40* (2013.01); *G01B 2290/45* (2013.01); *G01B 2290/70* (2013.01)

(58) Field of Classification Search
USPC ........................................ 356/479, 497, 495
See application file for complete search history.

(56) References Cited

U.S. PATENT DOCUMENTS

| | | | |
|---|---|---|---|
| 5,202,745 A * | 4/1993 | Sorin et al. | 356/73.1 |
| 5,365,335 A * | 11/1994 | Sorin | 356/479 |
| 6,137,574 A | 10/2000 | Hill | |
| 6,476,919 B1 * | 11/2002 | Mori et al. | 356/479 |
| 6,657,727 B1 * | 12/2003 | Izatt et al. | 356/450 |
| 6,806,963 B1 * | 10/2004 | Walti et al. | 356/497 |
| 6,856,400 B1 * | 2/2005 | Froggatt | 356/477 |
| 6,882,431 B2 | 4/2005 | Teich et al. | |
| 7,102,756 B2 * | 9/2006 | Izatt et al. | 356/479 |
| 2003/0103212 A1 | 6/2003 | Westphal et al. | |

* cited by examiner

*Primary Examiner* — Hwa Lee
(74) *Attorney, Agent, or Firm* — Myers Bigel & Sibley, PA (57) ABSTRACT

Optical coherence tomography (OCT) is an imaging method which can image with micrometer-scale resolution up to a few millimeters deep into, for example, living biological tissues and preserved tissue samples. An improved apparatus and image reconstruction algorithm for parallel Fourier Domain OCT which greatly eases requirements for interferometer stability and also allows for more efficient parallel image acquisition is provided. The apparatuses and algorithms reconstruct images from interfered, low-coherence, multiwave length signals having a .pi. radian phase difference relative to one another. Other numbers of signals and other phase differences may be alternatively used, with some combinations resulting in higher resolution and image stability. The apparatus also eliminates a need for bulk optics to modulate a phase delay in a reference arm of the optical path. Images may be reconstructed using two spectrometers, where each is coupled to a detector array such as a photodiode array.

21 Claims, 9 Drawing Sheets

SYSTEM FOR FOURIER DOMAIN OPTICAL COHERENCE TOMOGRAPHY

CROSS-REFERENCE TO RELATED APPLICATIONS

This application is a divisional application of and claims priority to application Ser. No. 10/854,426, filed May 27, 2004, now U.S. Pat. No. 7,697,145 which in turn claims priority to U.S. Provisional Patent Application Ser. No. 60/473,457 filed May 28, 2003, the contents of each of which are hereby incorporated herein by reference.

GOVERNMENT RIGHTS

This invention was made with United States Government support under Federal Grant No. BES 0134707 awarded by the National Science.

FIELD OF THE INVENTION

The invention relates to imaging systems and more particularly to tomographic and interferometric imaging systems with high resolution.

BACKGROUND OF THE INVENTION

Optical coherence tomography (OCT) is a method for noncontact optical imaging taking advantage of sequential or scanned distance measurements developed primarily in the 1990's. In biological and biomedical imaging applications, OCT allows for micrometer-scale imaging noninvasively in transparent and translucent biological tissues. The longitudinal ranging capability of OCT is based on low-coherence interferometry, in which light from a broadband source is split between illuminating the sample of interest and a reference path. The interference pattern of light reflected or backscattered from the sample and light from the reference delay contains information about the location and scattering amplitude of the scatterers in the sample. In conventional (time-domain) OCT, this information is extracted by scanning the reference path delay and detecting the resulting interferogram pattern as a function of that delay.

The envelope of the interferogram pattern thus detected represents a map of the reflectivity of the sample versus depth, called an "A-scan", with depth resolution given by the coherence length of the source. In conventional OCT systems, multiple A-scans are acquired while the sample beam is scanned laterally across the tissue surface, making a continuous series of distance measurements and building up a two-dimensional map of reflectivity versus depth and lateral extent called a "B-scan." The lateral resolution of the B-scan is given by the confocal resolving power of the sample arm optical system, which is usually given by the size of the focused optical spot in the tissue.

Time-domain OCT systems have been designed to operate at moderate (.about.1 image/sec) and high speeds (up to video rate), and have been applied for imaging in biological applications such as imaging of embryonic development, as well as in medical diagnostic applications such as imaging the structures of the anterior and posterior segments of the eye, the skin, the gastrointestinal tract, and other tissues. Specialized probes, endoscopes, catheters, and biomicroscope attachments have been designed to allow for OCT imaging in these applications.

The time-domain approach in conventional OCT has been by far the most successful to date in supporting biological and medical applications, and all in-vivo human clinical trials of OCT to date have utilized this approach. However, the time-domain approach in OCT suffers from some limitations. First, the requirement for mechanical scanning, such as with bulk optics, of the reference delay in conventional OCT introduces complexity, expense, and reduced reliability, especially those which image at high speed and acquire A-scans at kilohertz rates. The mechanical scanning reference delay line is typically the most complex optical apparatus in high-speed conventional OCT systems, and can be quite bulky as well. Second, since conventional OCT images are built up serially using a single detector and collecting one pixel of image information at a time, no advantage is taken of modern 1D and 2D array detection technologies which dominate other forms of optical imaging.

The serial collection or scanning approach of time-domain OCT is also very wasteful of sample arm light, in that an entire column of pixels is illuminated by that light while reflected light is only collected from one pixel at a time. This wastefulness of sample arm light is costly because sources of broadband light suitable for use in OCT systems are typically expensive and limited in their output power capability, and also because optical damage to tissue structures often limits the maximum power which may be used in OCT imaging, particularly in the retina. Where there is a limit on the amount of light which may be used to illuminate the sample, the wastefulness of sample arm light translates directly into increased image acquisition time. Further, the serial scanning approach in conventional OCT requires that the sample under investigation remains stationary during the acquisition of each A-scan, otherwise motion artifacts may appear in the image. Finally, primarily because of the requirement for a mechanical delay scan, conventional high-speed OCT systems are typically expensive, bulky, and require frequent optical alignment.

A potential solution to this need for a new approach has been variously termed spectral radar, Fourier-domain OCT (FDOCT), complex Fourier OCT, Optical Frequency-domain imaging, and swept-source OCT. In FDOCT, a different form of low-coherence interferometry is used in which the reference delay is fixed (except for potential wavelength-scale delay modulation in some implementations), and information about the location and amplitude of scatterers in the sample is derived from the optical spectrum of the light returning from the sample and mixing with the reference. This spectral information is typically acquired by spectrally dispersing the detector arm light using a spectrometer and detecting it with an array detector such as a charge-coupled device (CCD), or else by using a single detector and sweeping the source frequency as a function of time The A-scan data collected using FDOCT can be shown to be related (see below) to the inverse Fourier transform of the spectral data thus acquired. Initial implementations of FDOCT suffered from image artifacts resulting from: 1) large direct-current (DC) signals appearing on the detector array arising from non-interfering light returning from the reference delay and the sample, thus dwarfing the much smaller interferometric signals; and 2) autocorrelation of light signals between different reflections within the sample. As a result, initial results of FDOCT imaging were filled with artifacts and were not comparable to images obtained with time-domain OCT.

Recently, newer implementations of FDOCT have appeared which take advantage of techniques well known from phase-shifting interferometry (PSI) to eliminate the sources of both of the artifacts mentioned above. Since both artifacts resulted from light appearing on the detector array which does not arise from interference between sample and reference arm light, the recently introduced technique of complex FDOCT eliminates these artifacts by acquiring multiple spectra with different phase shifts introduced into the reference delay path.

In a simple implementation of FDOCT, the reference delay consists of a mirror mounted on a piezoelectric actuator (PZT). One spectrum is acquired at a given position of the mirror, and then another is acquired with a path-length delay of $\lambda/2$ (resulting in a round-trip phase shift of $\pi$) introduced into the reference arm by the PZT. It is straightforward to show that this $\pi$ phase shift reverses the sign of the interferometric light components but has no effect on the DC components of the detector arm light, so subtracting the spectra obtained at 0 and $\pi$ phase shifts results in a spectrum free of DC artifacts. This spectrum can be considered the real part of the complex Fourier transform of the A-scan. Thus, taking the inverse Fourier transform reconstructs the original A-scan. However, since only the real part of the complex Fourier spectrum is acquired, the A-scan data reconstructed is restricted to be symmetric. Specifically, $f(-z)=f^*(z)$, and thus only A-scan data for positive displacements (i.e., z>0) can be reconstructed.

As a further refinement of this phase-shifting technique, an additional spectrum may be acquired for a path-length delay of $\pi/4$ (corresponding to a round-trip phase shift of $\pi/2$). This spectrum (also optionally corrected for DC components by division by one of the other spectra or by subtraction with a spectrum acquired with a path-length delay of $3\pi/4$) may be considered the imaginary part of the complex Fourier transform of the A-scan. Thus, taking the inverse Fourier transform of the complete complex spectrum (resulting from all two, three, or four phase measurements) allows for unambiguous reconstruction of all depths in the sample limited only by spatial sampling considerations. Additional refinements to this approach may be applied which are commonplace in phase-shifting interferometry, such as the use of additional phase delays for increased accuracy in measuring the complex spectrum.

Complex FDOCT thus addresses several of the needs for OCT systems with decreased complexity and cost and increased reliability, having a mostly fixed reference delay and utilizing an array detector. However, serious limitations to these prior art complex FDOCT implementations include: 1) a means is still required for displacing the reference delay by distances on the scale of a wavelength; all prior systems perform this function by using bulk optical devices outside of the reference arm optical fiber; and 2) the spectra obtained at different reference phases are obtained sequentially, thus the sample and reference arms must be maintained interferometrically motionless during the entire A-scan spectrum acquisition.

SUMMARY OF THE INVENTION

An object of the invention is to solve at least the above problems and/or disadvantages and to provide at least the advantages described hereinafter.

Another object of the invention is to provide an approach to OCT which eliminates the need for a mechanically scanned reference delay and makes use of array detection technologies to acquire signals from all illuminated axial pixels of an A-scan simultaneously.

Another object of the invention is to enable the construction of OCT systems which are inexpensive, compact, and are mechanically stable such that they rarely require optical realignment.

Another object of the invention is to provide an improvement to FDOCT which does not require any means for modulation of the reference arm path length, or may accomplish such modulation within the existing reference arm optical fiber.

Another object of the invention is to provide an FDOCT system which obtains the multiple phase delays required for elimination of image artifacts and/or removal of constraints on A-scan asymmetry simultaneously, thus relaxing constraints on sample and reference motion during A-scan acquisition.

To achieve the aforementioned objects, an improved system for FDOCT is provided which implements readout of multiple reference phases in two or more detector channels simultaneously.

To further achieve the aforementioned objects, an improved system for FDOCT is provided which eliminates the need for a mechanically scanned reference delay and makes use of array detection technologies or wavenumber swept sources to acquire signals from all illuminated axial pixels of an A-scan simultaneously.

To further achieve the aforementioned objects, a method is provided which takes advantage of inherent $\pi$ phase differences between different ports of interferometers, and which also utilizes orthogonal polarization channels within the reference delay to encode arbitrary phase delays is provided.

To further achieve the aforementioned objects, a system is provided that utilizes photodiode arrays for optimal S/N ratio in FDOCT.

To further achieve the aforementioned objects, a system is provided that utilizes silicon-based photodiode arrays for FDOCT in the 830 nm OCT window and InGaAs arrays for FDOCT in the 1310 nm and 1550 nm spectral regions. Further advantages of the use of dual-stripe and two-dimensional CCD and photodiode arrays are also disclosed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

Figure 1A:
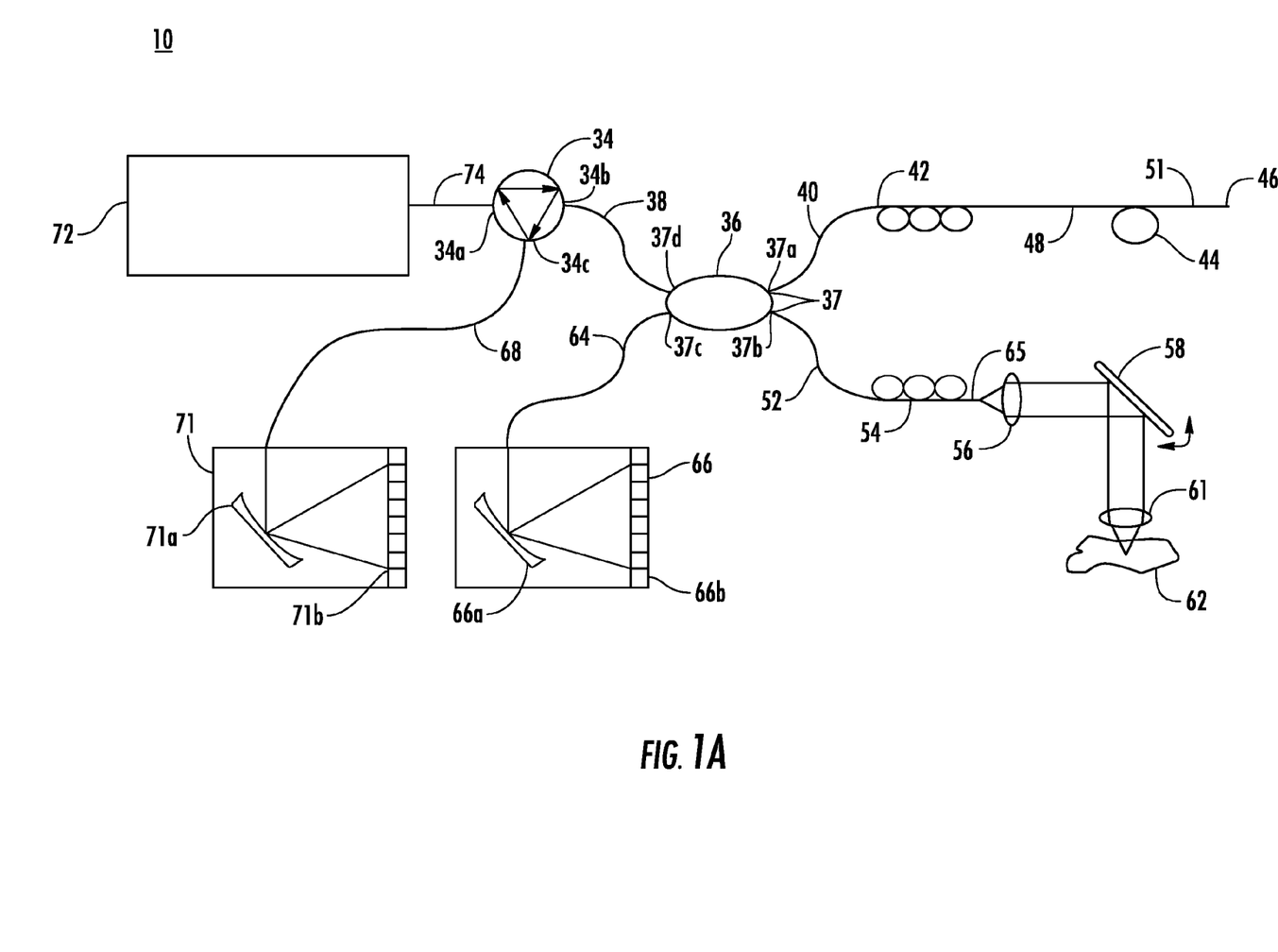
FIG. 1A is a schematic illustration of a first embodiment of a FDOCT system, in accordance with the present invention.

Referring to FIG. 1A, a first FDOCT 10 in accordance with one embodiment of the present invention, is shown. The FDOCT 10 of FIG. 1A includes an optical circulator 34 with three ports 34a, 34b and 34c, and a first fiber coupler 36 having four Michelson interferometer ports 37a, 37b, 37c and 37d. The optical circulator 34 and the first fiber coupler 36 together make up an optical manipulator 1. The first fiber coupler 36 is coupled to a first polarization controller 42 by a single mode (SM) optical fiber 41. The first polarization controller 42 is coupled to a first phase modulator 44 by a SM optical fiber 48. The first phase modulator 44 is coupled to a SM optical fiber 51 which terminates in a reflector 46. Together the first polarization controller 42, first phase modulator 44 and reflector 46, plus SM optical fibers 48 and 46, form a reference arm.

A second polarization controller 54 is coupled by a SM optical fiber 52 to the first fiber coupler 36. The second polarization controller 54 is optically coupled to a first lens 56 by a SM optical fiber 65. The first lens 56 is configured to capture a signal exiting the SM optical fiber 65, and direct the signal to scanning optics 58, preferably a moveable mirror. The scanning optics 58, together with second lens 61, directs the signal onto a sample 62 and receive a reflected signal therefrom. The second polarization controller 54, first lens 56, scanning optics 58, and second lens 60, a SM optical fiber 52 and SM optical fiber 65 form a sample arm. Applicant notes that the terms "signal," "beam," and "light" are used synonymously to include all forms of electromagnetic radiation suitable for use in imaging systems.

Also connected by a SM optical fiber 64 to the first fiber coupler 36 is a first detector 66 having a first spectrometer 66a and first array detector 66b. A second detector 71 is coupled to the optical circulator 34 by a SM optical fiber 68. The optical circulator 34 may additionally be configured to receive a signal from a source 72 through a SM optical fiber 74. The first and second detectors, 66 and 71, and SM optical fibers 64 and 68 together form a detector portion of the FDOCT 10.

The FDOCT system 10 is preferably implemented using a SM fiber Michelson interferometer illuminated by a broadband short-coherence length light source 72. Light from the source 72 may be evenly split between sample and reference arms by the first fiber coupler 36. The sample arm can optionally include a second polarization controller 54 for controlling the polarization state of the optical signal and scanning mirror 58 and lens 61 for scanning and focusing the sample arm signal onto the sample 62.

The reference arm may have a fixed path length, preferably obtained by placing a reflector 46 on the tip of the reference arm fiber 51 (thus eliminating bulk optics entirely in the reference arm and the substantial losses incurred in coupling out of and back into the SM fiber 51).

The reference arm may also optionally include a first polarization controller 42 for matching the polarization state in the reference arm to that in the sample arm, and may also optionally include a first phase modulator 44 which is capable of selectively causing wavelength-scale variations in the reference delay under user control. The first phase modulator 44 can be placed in the sample arm in this and all subsequent implementations without any loss of functionality. Light from the third port 34c of the first circulator 34 and light from the third Michelson interferometer port 37c of the fiber coupler 36, having 180° phase difference between them may be coupled into a pair of detectors, 71 and 66 respectively. Detectors 66 and 71 each preferably include spectrometers 66a and 71a, and array detector, 66b and 71b, respectively. This configuration is designed to place copies of the phase-shifted optical spectrum onto a matched pair of array detectors.

The FDOCT 10 of FIG. 1A acquires a pair of FDOCT spectra, with .pi. radians phase difference between them, on a pair of array detectors to eliminate most motion artifacts associated with conventional phase-shift interferometry. Spectrometers 66a and 71a, and array detectors 66b and 71b are preferably matched as closely as possible in their optical and electronic characteristics. This can be accomplished by using spectrometers and detector arrays of matching design.

In operation, the FDCOT 10 acquires spectra having a relative phase delay of 180° between them from interferometer ports 37c and 3 of the interferometer, and differences the spectra in order to eliminate sample and reference arm DC and sample arm autocorrelation terms. The resulting difference spectrum is inverse Fourier transformed to acquire a one-sided A-scan. Care must be taken to assure that the length of the reference arm is adjusted so that no reflections are observed for z<0.

In an alternative mode of operation, the FDOCT 10 acquires a 180.degree. relative phase delay between them and differences them in order to eliminate most sample and reference arm DC and sample arm autocorrelation terms, as designated above. The first phase modulator 44 in the reference arm is then adjusted for 90° of additional reference delay. Simultaneous spectra having 90° and 270°. phase delay between them are then acquired and differenced in order to eliminate most sample and reference arm DC and sample arm autocorrelation terms. The first and second difference spectra may then be taken as the real and imaginary parts, respectively, of the complex Fourier transform of the two-sided A-scan. An inverse Fourier transform may be performed on the complex data to obtain the A-scan free of symmetry considerations. Additional phase delays of the first phase modulator 44 may also be selected, and orthogonal pairs of spectra obtained, according to established algorithms for phase-shift interferometry.

Figure 1B:
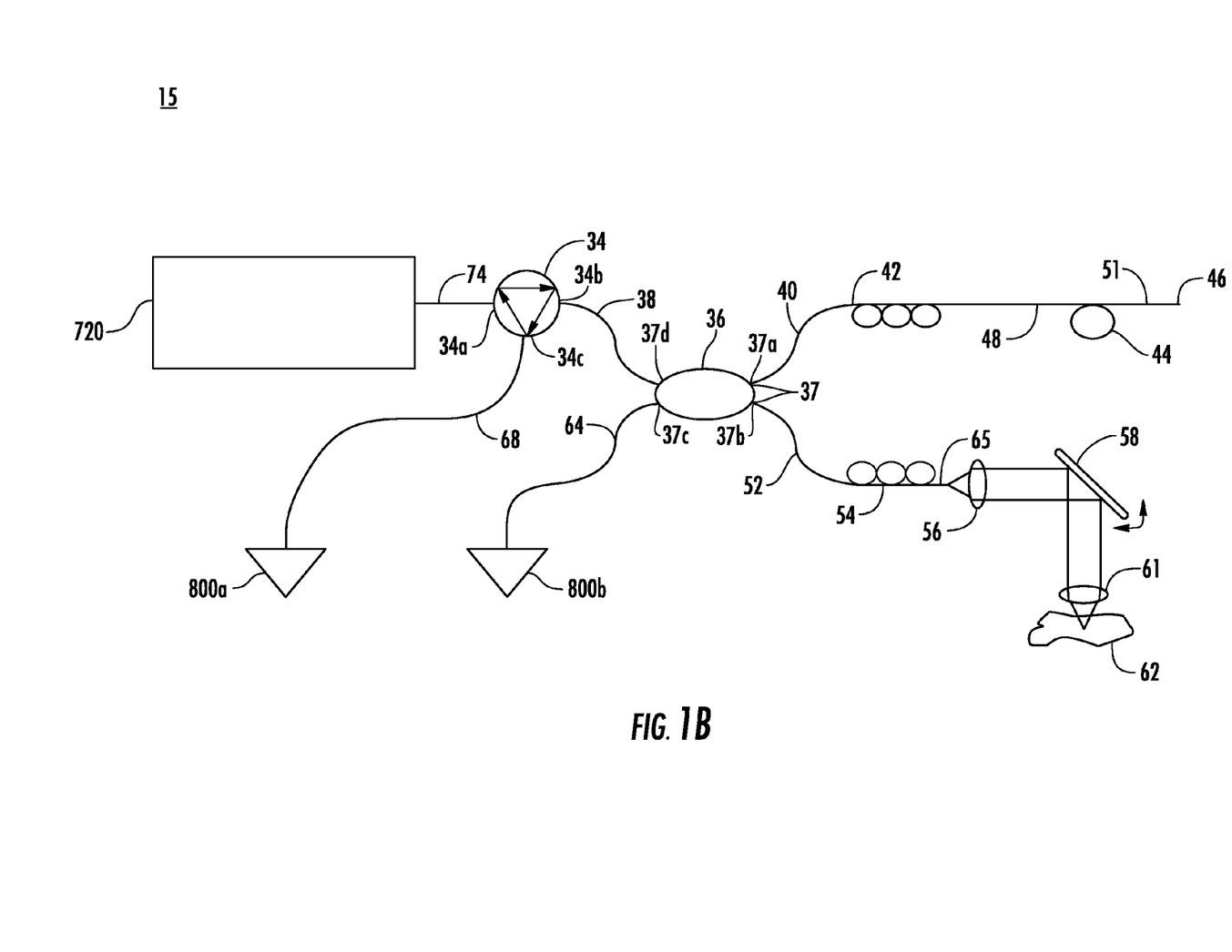
FIG. 1B is a schematic illustration of a second embodiment of a FDOCT system, similar to the embodiment of FIG. 1, that utilizes a support frequency source, in accordance with the present invention.

FIG. 1B shows a second FDOCT 15, in accordance with a second embodiment of the present invention. The FDOCT 15 fifteen of FIG. 1B is similar to the FDOCT system 10 of FIG. 1A, except that a swept-frequency source 720 is used in place of the broadband short-coherence length light source 72 of FIG. 1A. In addition, single-channel detectors 800A and 800B are used in place of the spectrometer/array detector combinations of FIG. 1A.

The swept-frequency source 720 is preferably a narrowband light source whose frequency can be swept as a function of time. In the embodiment of FIG. 1B, the spectrum of the interferometer output(s) is obtained by monitoring the output of the detectors 800A, 800B as a function of time while the frequency of the swept-frequency source 720 is swept.

The additional embodiments discussed below will be shown with a broadband light source, and with spectrometer/array detector(s) that are used to resolve the spectrum of the interferometer output. However, it should be appreciated that all of the embodiments described below can also be implemented in a swept-source configuration, such as the configuration shown in FIG. 1B, by replacing the broadband source with a swept-frequency narrowband source, and by replacing each detector with a single-channel time-resolved detector. When Fourier Domain OCT is performed using a swept-source implementation, then all of the same advantages conferred by obtaining multiple simultaneous phase differences, either from multiple output ports of the various interferometer topologies, from polarization encoding of phase in the interferometer arms, or a combination of both approaches, will apply.

Figure 2:
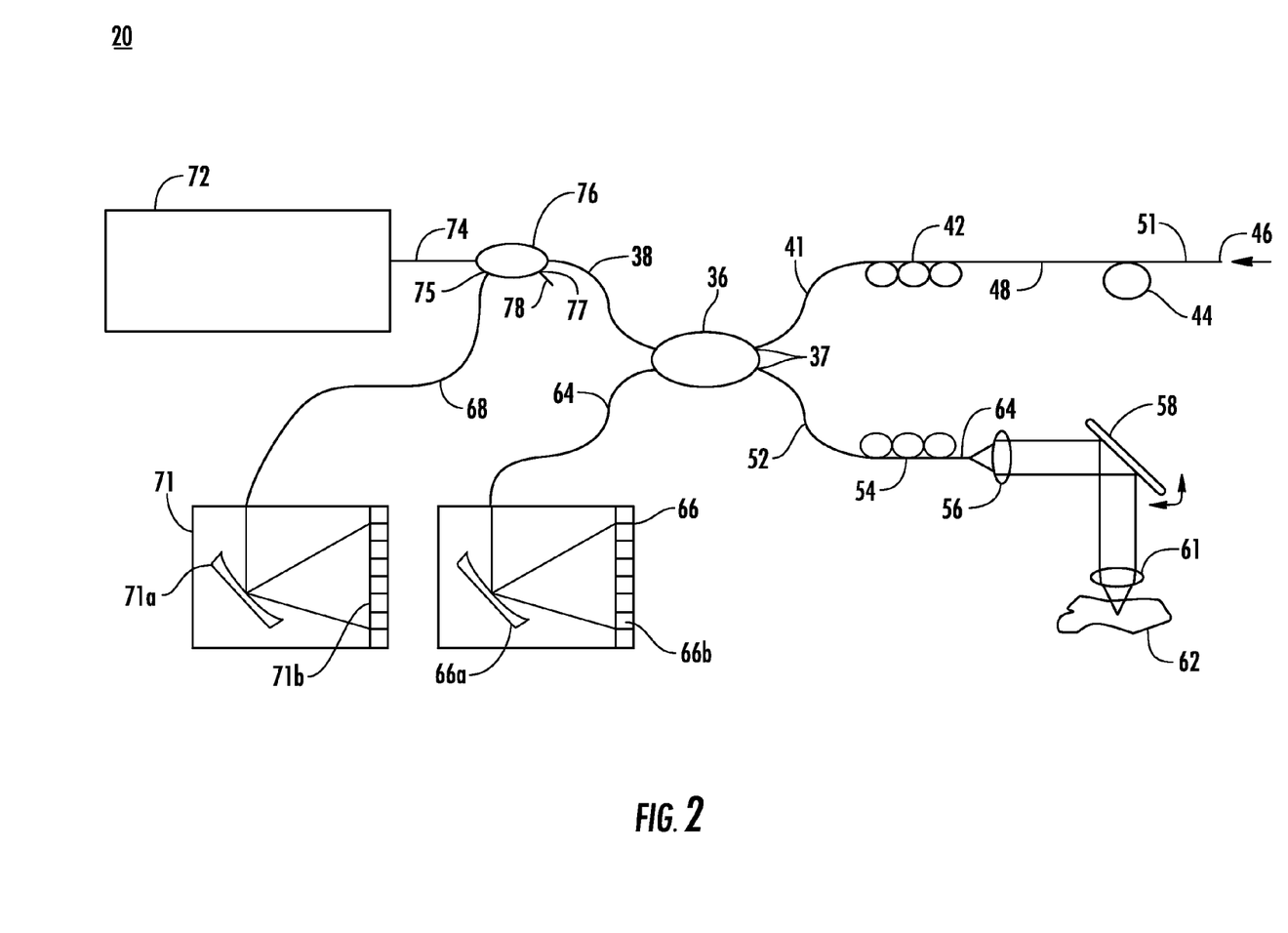
FIG. 2 is a schematic illustration of a third embodiment of a FDOCT, system in accordance with the present invention.

FIG. 2 shows a second FDOCT embodiment 20, in accordance with the present invention. Similar to the FDOCT embodiment 10 shown in FIG. 1A, the FDOCT embodiment 20 of FIG. 2 has a fiber coupler 36 connected to a first polarization controller 42 by a SM optical fiber 41. The first polarization coupler 42 is connected to a phase modulator 44 by a SM optical fiber 48. The phase modulator 44 has a fiber 51 extending therefrom terminating in a reflector 46. Additionally, the first fiber coupler 36 is connected to a second polarization controller 54 by a SM optical fiber 52. The second polarization controller 54 is optically coupled to a first lens 56 by a SM optical fiber 64. The first lens 56 directs an optical output signal from fiber 64 to scanning optics 58. Scanning optics 58 and lens 61 direct the optical signal to sample 62. Reflected optical signals from the sample 62 are coupled back into fiber 64 via lens 61 scanning optics 58 and lens 56.

The first fiber coupler 36 is also connected to a first detector 66 by a SM optical fiber 64. In a variation from the first FDOCT embodiment 10, the first fiber coupler 36 is connected to a second fiber coupler 76 through a SM optical fiber 38. The second fiber coupler 76 is connected to a second detector 71 through a SM optical fiber 68, and includes a 0.degree. port 75 and a 180.degree. port 77. The second fiber coupler 76 also includes a SM optical fiber stub 78 connected to the 180°. port 77. A low coherence source 72 may also be connected to the second fiber coupler 76 through a SM optical fiber 74.

The FDOCT embodiment 20 of FIG. 2 is similar in many respects to the FDOCT embodiment 10 of FIG. 1A, except that a second fiber coupler 76 is used in the source arm to provide one of the orthogonal phase components, in place of the first circulator 34 of FIG. 1A. Use of a second fiber coupler 76 may be preferable for decreasing system cost or if circulators are not available to meet the specified wavelength or bandwidth requirements. The penalty for use of the second fiber coupler 76 in place of a circulator will result in a higher insertion loss (3 dB for a fiber coupler versus –0.7 dB for a circulator) in the forward direction, plus a 3 dB loss in the reverse direction of the 0.degree. port 75, which will need to be matched by an equal amount of attenuation of the 180.degree. port 64 in order to match DC levels on the detectors 66 and 71.

Thus, the FDOCT embodiment 20 may experience a total loss of source light of approximately 6 dB loss (not counting circulator insertion losses) as compared to the FDOCT embodiment 10. As in the FDOCT embodiment 10 of FIG. 1A, the separate spectrometers 66a and 71a, and array detectors 66b and 71b of the first and second detectors 66 and 71 could be replaced by an imaging spectrometer and a dual-row or three-color detector array. Also, any of the three modes of operation discussed in connection with the FDOCT embodiment 10 of FIG. 1A may also be used in the FDOCT of FIG. 2.

Figure 3:
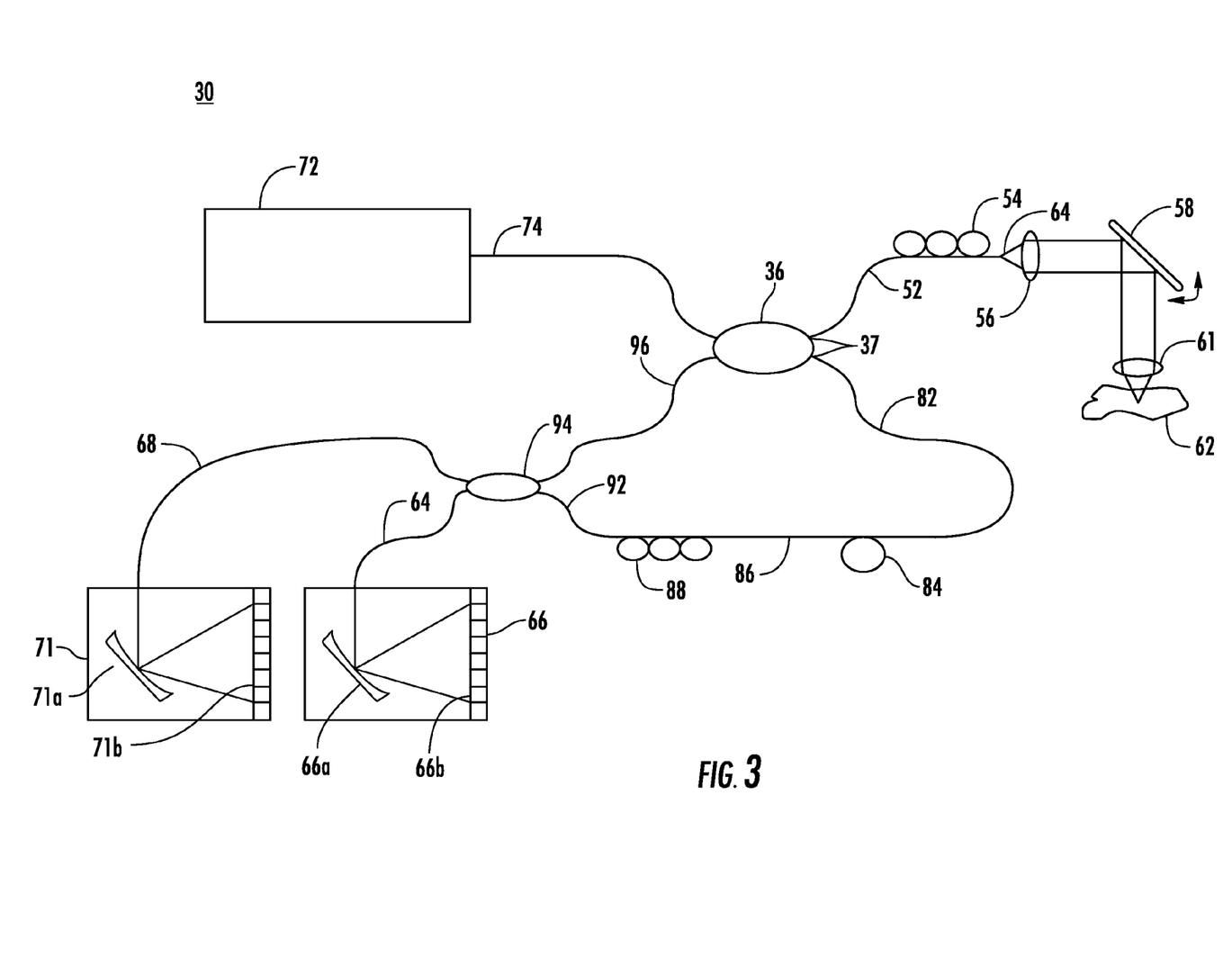
FIG. 3 is a schematic illustration of a fourth embodiment of a FDOCT system, in accordance with the present invention.

FIG. 3 illustrates a third FDOCT embodiment 30, in accordance with the present invention. Similar to the FDOCT embodiments 10 and 20 discussed above, the FDOCT embodiment 30 includes a fiber coupler 36 coupled to a second polarization controller 54 through a SM optical fiber 52. The first fiber coupler 36 includes interferometer ports 37a, 37b, 37c and 37d. The second polarization controller 54 is optically coupled to a first lens 56 through a SM optical fiber 56. The first lens 56 directs and receives signals to and from a sample 62 through scanning optics 58 and second lens 61.

Also attached to the first fiber coupler 36 is a reference arm including a second phase modulator 84 connected to the first fiber coupler 36 with a SM optical fiber 82. The second phase modulator 84 is connected to a third polarization controller 88 with a SM optical fiber 86. The third polarization controller 88 is connected to a third fiber coupler 94 through a SM optical fiber 92. The third fiber coupler 94 is also connected to the first fiber coupler 36 with a SM optical fiber 96. The third fiber coupler 94 is connected to a first detector 66 and a second detector 71 through SM optical fibers 64 and 68, respectively. The FDOCT embodiment 20 of FIG. 2 may also include a source 72 coupled to the first fiber coupler 36 through a SM optical fiber 75.

FIG. 3 illustrates a FDOCT embodiment 30, in accordance with the present invention, which takes advantage of the intrinsic phase difference between interferometer ports 37a and 37b of the first fiber coupler 36, but has a transmissive reference delay rather than a reflective one. Other aspects of the FDOCT embodiment 30 are similar to the previously discussed FDOCT embodiments 10 and 20. The FDOCT embodiment 30 of FIG. 3 may experience a loss of 3 dB of the sample arm reflected light (which is returned into the source). However, this 3 dB loss is less than the corresponding configurations in other FDOCT embodiments, and is approximately the same loss experienced by time-domain OCT in a conventional Michelson interferometer. Thus, the FDOCT embodiment 30 of FIG. 3 is the preferred implementation when a circulator is unavailable or undesirable. As in the previously discussed FDOCT embodiments 10 and 20, optimally the first and second spectrometers 66a and 71a and first and second array detectors 66b and 71b could be replaced by an imaging spectrometer and a dual-row or three-color detector array. Also, any of the three modes of operation discussed above in connection with FDOCT embodiments 10 and 20, may also be used.

Figure 4:
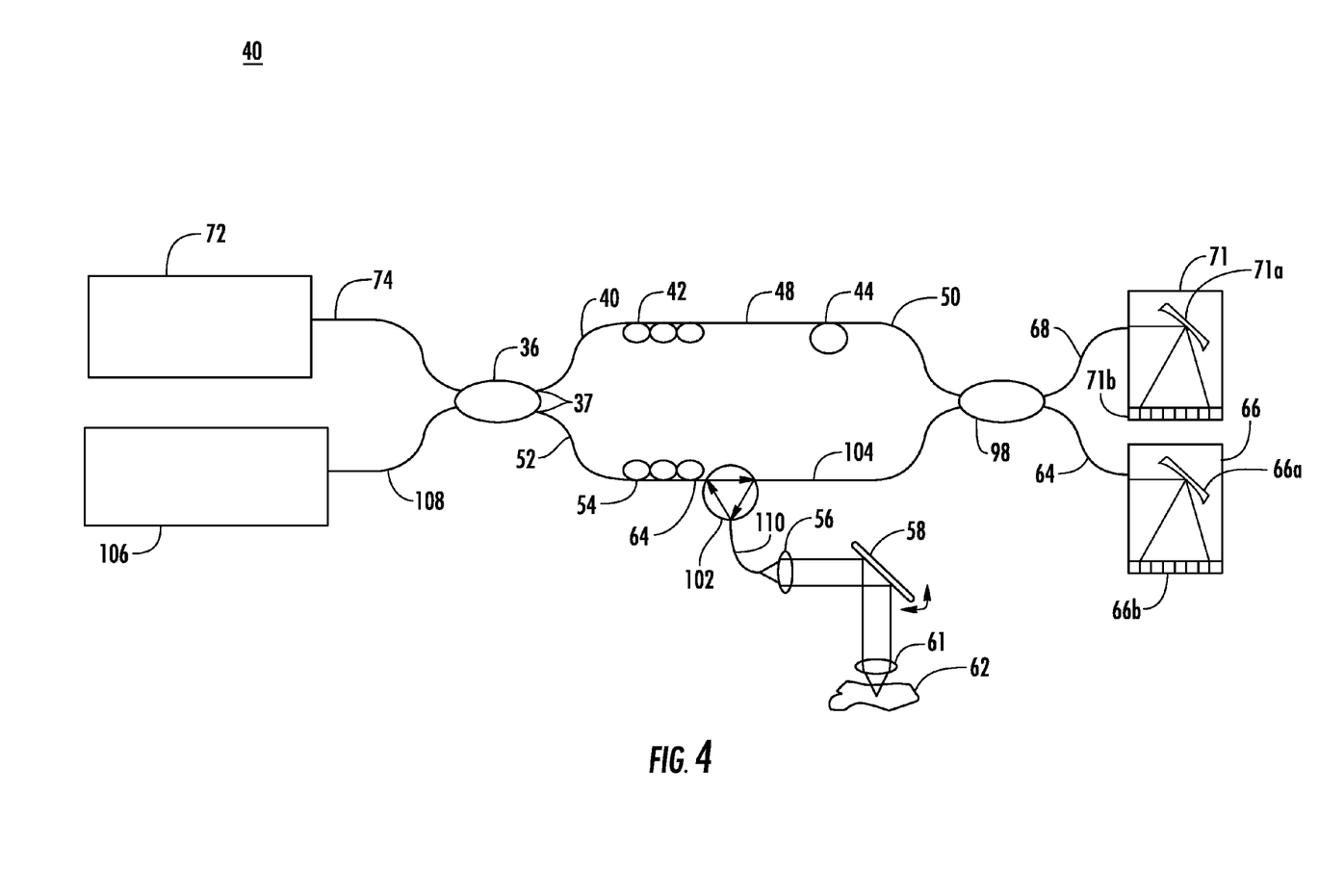
FIG. 4 is a schematic illustration of a fifth embodiment of a FDOCT system, in accordance with the present invention.

FIG. 4 illustrates a fourth FDOCT embodiment 40, in accordance with the present invention. The FDOCT embodiment 40 includes a first fiber coupler 36 which is coupled to a first polarization controller 42 by a SM optical fiber 41. The first fiber coupler 36 has four interferometer ports 37a, 37b, 37c, and 37d. One interferometer port 37a is coupled to a first polarization controller 42 by a SM fiber 41, and the second interferometer port 37b is coupled to a second polarization controller 54 by a SM fiber 52. The first polarization controller 42 is coupled to a first phase modulator 44 by a SM optical fiber 48. The second polarization controller 54 is coupled to the first fiber coupler 36 by a SM optical fiber 52, and to a second circulator 102 by a SM optical fiber 64. The second circulator 102 has a SM optical fiber 110 optically coupled to a first lens 56, which directs and receives a signal to and from a sample 62 through scanning optics 58 and second lens 61. The second circulator 102 is also coupled to a fourth fiber coupler 98 through a SM optical fiber 104. The first phase modulator 44 is also coupled to the fourth fiber coupler 98 by a SM fiber 50.

The fourth fiber coupler 98 is coupled to first and second detector 66 and 71 through SM optical fibers 64 and 68, respectively. The FDOCT embodiment 40 may also include a first source 72 coupled to the first fiber coupler 36 through a SM optical fiber 74 and a second source 106 coupled to the fiber coupler 36 through a SM optical fiber 108.

The FDOCT embodiment 40 of FIG. 4 takes advantage of the intrinsic phase difference between interferometer ports 37a and 37b, and also has a transmissive delay. However, the FDOCT embodiment 40 uses a second circulator 102 to direct light onto the sample 62. The FDOCT embodiment 40 also places the second circulator 102 within one of the arms of the interferometer, where chromatic and polarization mode dispersion effects within the second circulator 102 may be problematic.

However, the embodiment 40 makes highly efficient use of source light (except for insertion losses in the circulator 102 itself), and also allows for the introduction of a second source 106. This may be preferable in order to increase the power of low-coherence light on the sample 62 from available light sources 72 and 106, and also may be used to increase the bandwidth of illumination by using sources with displaced center wavelengths. As in the previously discussed FDOCT embodiments 10, 20 and 30, the separate spectrometers 66a and 71a and array detectors 66b and 71b could be replaced by an imaging spectrometer and a dual-row or three-color detector array. Also, any of the three modes of operation discussed above in connection with the previously discussed FDOCT embodiments 10, 20 and 30 may be used in the FDOCT embodiment 40 of FIG. 4.

All the FDOCT embodiments discussed above may take advantage of the intrinsic .pi. phase delay which is found between output ports of Michelson and Mach-Zehnder interferometers. As described above, this phase delay may be used to simultaneously obtain pairs of spectra which may be differenced to remove non-interferometric noise from the spectral data. However, it also may be desirable to obtain pairs of spectra with .pi./2 phase delay simultaneously, to allow for both removal of non-interferometric noise and also for unambiguous calculation of sample reflectivity without symmetry artifacts. The embodiments described below take advantage of polarization to encode arbitrary phase delays into spectra which may be measured simultaneously.

Figure 5:
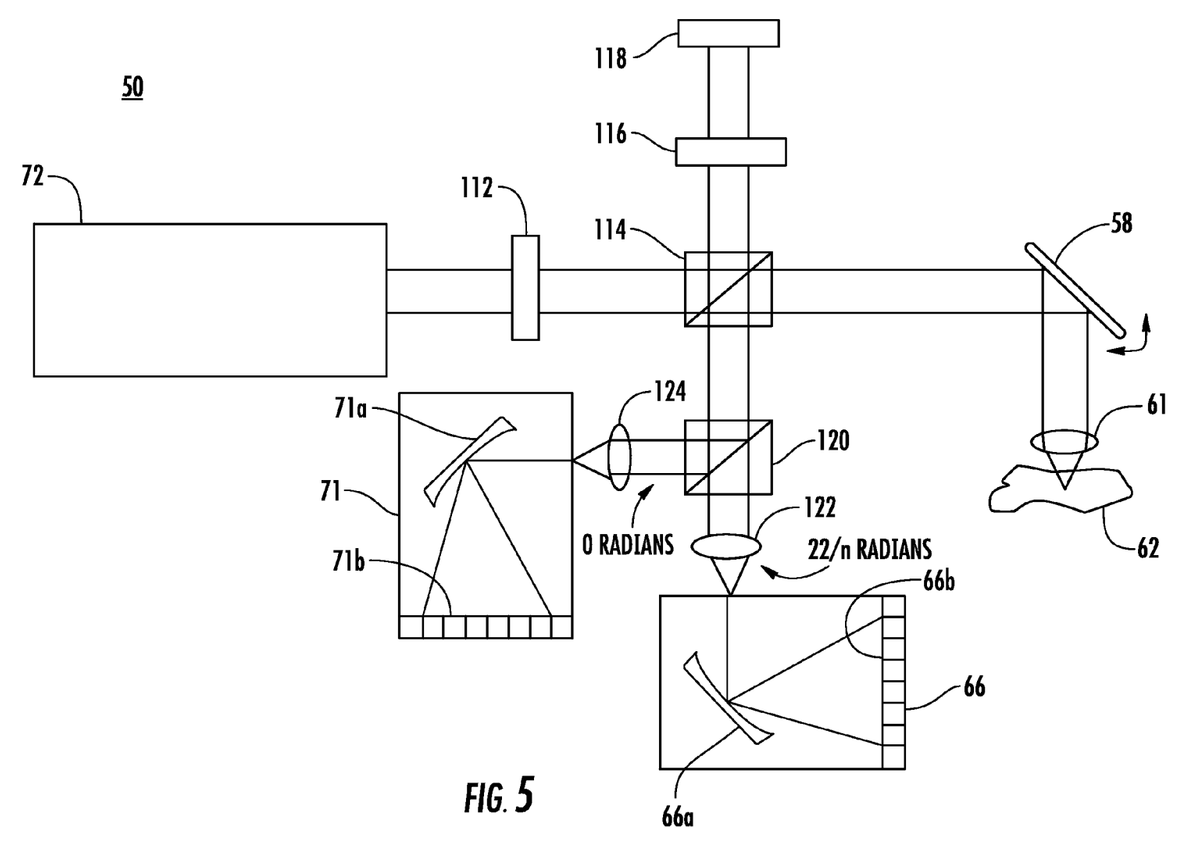
FIG. 5 is a schematic illustration of a sixth embodiment of a FDOCT system, in accordance with the present invention.

FIG. 5 illustrates a fifth FDOCT embodiment 50, in accordance with the present invention. The FDOCT embodiment 50 includes a non-polarizing beam splitter 114 optically coupled to a λ./n waveplate 116 and a fixed reference mirror 118. The non-polarizing beam splitter 114 is also optically coupled to a sample 62 through scanning optics 58 and second lens 61. The non-polarizing beam splitter 114 is additionally optically coupled to a polarizing beam splitter 120. Polarizing beam splitter 120 is optically coupled to a first detector 66 through lens 122, and a second detector 121 through lens 124. The FDOCT embodiment 50 may also include a source 72 optically coupled to the non-polarizing beam splitter 114 through a polarizer 112.

The FDOCT embodiment 50 is similar to a bulk-optic Michelson interferometer which may encode a 90.degree. phase shift into two polarization channels, which are separated outside of the interferometer by the polarizing beam splitter 120. The two polarization channels may be directed into a matched pair of spectrometers 66a and 71a and array detectors, 66b and 71b. Light emitted from the preferably low-coherence source 72 may be linearly polarized at 45.degree. from the vertical by a polarizer 112 placed in the source arm. The non-polarizing beamsplitter 114 splits this light evenly between sample and reference arms. A λ/n. waveplate 116 (for n=2, 4, 8, etc.) may be placed in the reference arm, with its fast axis oriented vertically (i.e., at 0.degree. to the vertical).

Thus, the horizontal component of the light in the reference arm may experience a phase delay of 4π/n radians with respect to the vertical component after double-passing the λ/n waveplate 116. These two components may be separated by the polarizing beamsplitter 120 in the detector arm, which sends the phase-delayed components of the reference, arm light, along with an equal division of the light reflected from the sample 62, into a matched pair of spectrometers 66a and 71a, and array detectors, 66b and 71b.

For example, for n=8, i.e. an eighth-wave plate in the reference arm, there will be a λ/4 or 90° phase difference between the spectra obtained from the reference and sample arms, which is sufficient for unambiguous reconstruction of the sample reflectivity from the complex spectrum thus obtained. For other values of n, i.e., n=4 (quarter-wave plate), n=2 (half-wave plate), other phase delays between the collected spectra may also be obtained as needed for various phase-shift interferometry reconstruction algorithms. Although only 2 phase delays may be encoded into polarization, the polarization-based approach of the FDOCT embodiment 50 may be combined with the intrinsic interferometer port phase difference methods of the other FDOCT embodiments discussed above to obtain at least 4 simultaneous spectra with different phase delays.

As another example, the addition of a circulator into the source arm of the FDOCT embodiment 50, which may direct light into another polarizing beamsplitter and two more spectrometers, would allow for the simultaneous acquisition of spectra having 0°, 90°, 180°, and 270° phase differences. It will be clear to one of ordinary skill in the art that numerous other implementations of the inventive concept of polarization encoding of phase may be used as extensions of the FDOCT embodiment 50, such as the rotation of all polarization-sensitive elements in the embodiment 50 by a fixed angle, or numerous alternative placements of the polarization-sensitive elements (including placing of the λ/n plate 116 in the sample arm instead of the reference arm), while still falling within the scope of the present invention.

Modes of operation of the FDOCT embodiment 50 of FIG. 5 includes acquiring simultaneous spectra having 0° and 180° phase delay by use of a λ/4 waveplate in the reference arm. The spectra may be differenced in order to eliminate sample and reference arm DC and sample arm autocorrelation terms. The resulting difference spectrum may be inverse Fourier transformed to acquire a one-sided A-scan. The length of the reference arm is preferably adjusted so that no reflections are observed for z<0.

Another mode of operation for use with the FDOCT embodiment 50 of FIG. 5 includes acquiring simultaneous spectra having 0° and 90° phase delay between them and differencing them in order to eliminate sample and reference arm DC and sample arm autocorrelation terms. These spectra may be taken as the real and imaginary parts, respectively, of the complex Fourier transform of the two-sided A-scan. The inverse Fourier transform may then be performed on the complex data to obtain the A-scan free of symmetry considerations.

Another mode of operation for use with the FDOCT embodiment 50 of FIG. 5 includes acquiring simultaneous spectra having 0°, 90°, 180°, and 270° phase difference between them, by use of a combination of polarization encoding of phase and intrinsic phase delay between interferometer ports, as described above. Pairs of spectra having 180° phase delay between them may be differenced in order to eliminate sample and reference arm DC and sample arm autocorrelation terms. The differenced pairs of spectra may then be taken as the real and imaginary parts, respectively, of the complex Fourier transform of the two-sided A-scan. The inverse Fourier transform may be performed on the complex data to obtain the A-scan free of symmetry considerations.

Figure 6:
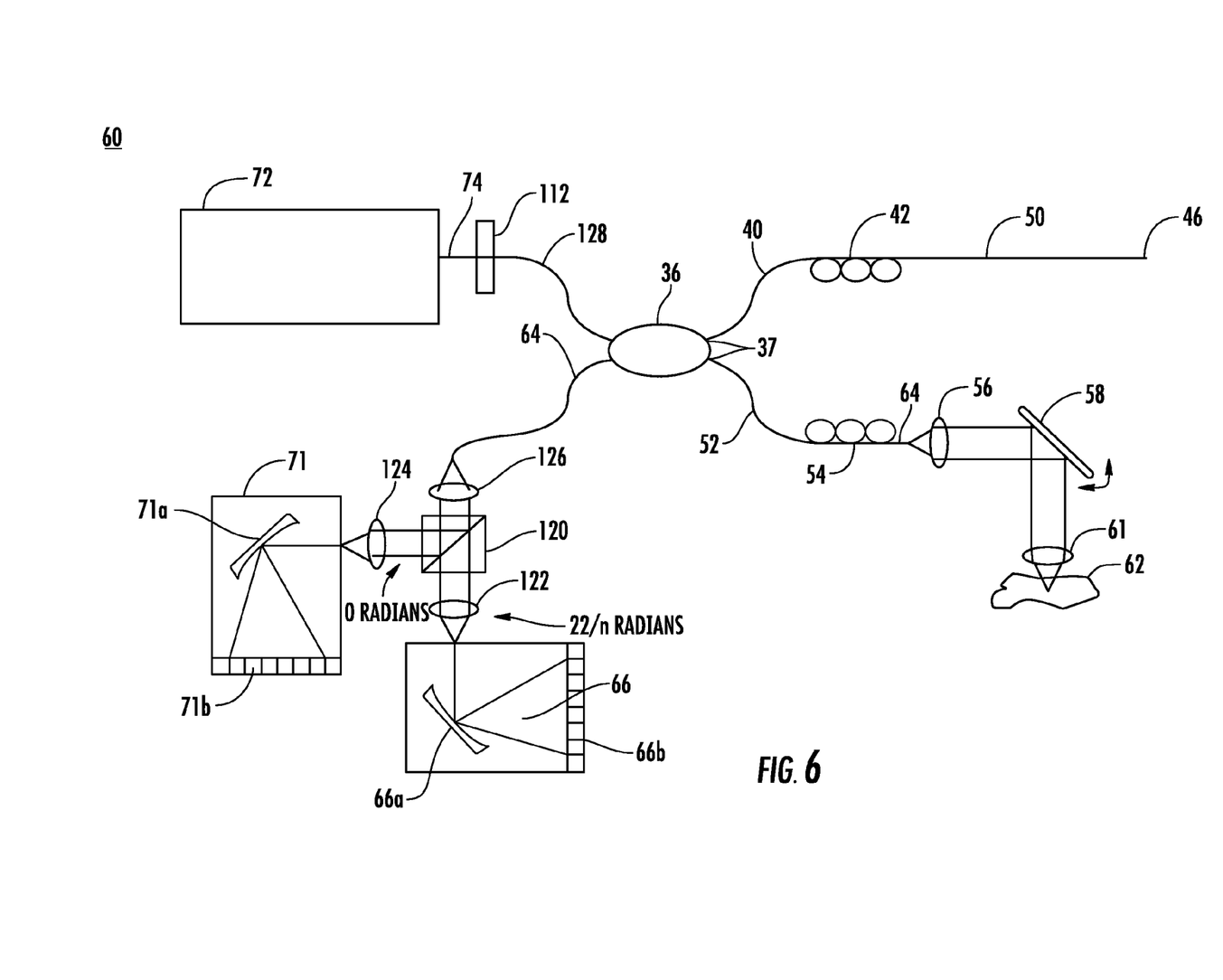
FIG. 6 is a schematic illustration of a seventh embodiment of a FDOCT system, in accordance with the present invention.

FIG. 6 illustrates a sixth FDOCT embodiment 60, in accordance with the present invention. The FDOCT embodiment 60 includes a first fiber coupler 36 coupled to a first polarization controller 42 through a SM optical fiber 41. The first polarization controller 42 is coupled to a SM optical fiber 51, which terminates in a reflector 46. The first fiber coupler 36 is also coupled to a second polarization controller 54 through a SM optical fiber 52. The second polarization controller 54 is optically coupled to a first lens 56 through a SM optical fiber 64. The first lens 56 is optically coupled to a sample 62 through a scanning optics 58 and second lens 61. The first fiber coupler 36 is also coupled to a third lens 126 through a coupler 64. The third lens 126 is optically coupled to a polarizing beam splitter 120. The polarizing beam splitter 120 is optically coupled to a lens 122 and a first detector 66. The polarizing beam splitter 120 is also optically coupled to a lens 124 and a second detector 71.

It is preferable to have the capability for arbitrary simultaneous dual phase delays between acquired spectra in a fiber interferometer, since most practical OCT systems to date make use of the flexibility of fiber optic systems for medical and biological applications. The FDOCT embodiment 60 illustrates one possible implementation of a fiber-optic interferometer for imaging, which uses polarization for phase encoding. In this embodiment, the light source 72 is either polarized or a polarization element 112 (such as a fiber polarizer) is used in the source arm. Preferably, the interferometer is constructed from polarization-maintaining fiber (PMF), although previous work in polarization-sensitive OCT has shown that non-PMF fiber is also capable of maintaining phase relationships between orthogonal polarization states propagating through the fiber. In the FDOCT embodiment 60 of FIG. 6, a fiber polarization controller 42 in the reference arm may be used to simulate the $\lambda/n$ waveplate 116 in the FDOCT embodiment 60, and the second polarization controller 54 in the sample arm may be used to correct for stress-induced birefringence in the sample arm fiber assembly.

Although the FDOCT embodiment 60 is just one example of polarization phase encoding in a fiber interferometer, any of the fiber interferometers shown in the FDOCT embodiments described above could be altered to use polarization phase encoding by the addition of a PBS and matched pair of spectrometers to each output port 37a and 37b. Modifications of the FDOCT embodiments described above in this way would result in the simultaneous collection of spectra with 4 phase delays (pairs of which are separated by 180°) since each of those implementations have dual interferometer outputs.

Figure 7:
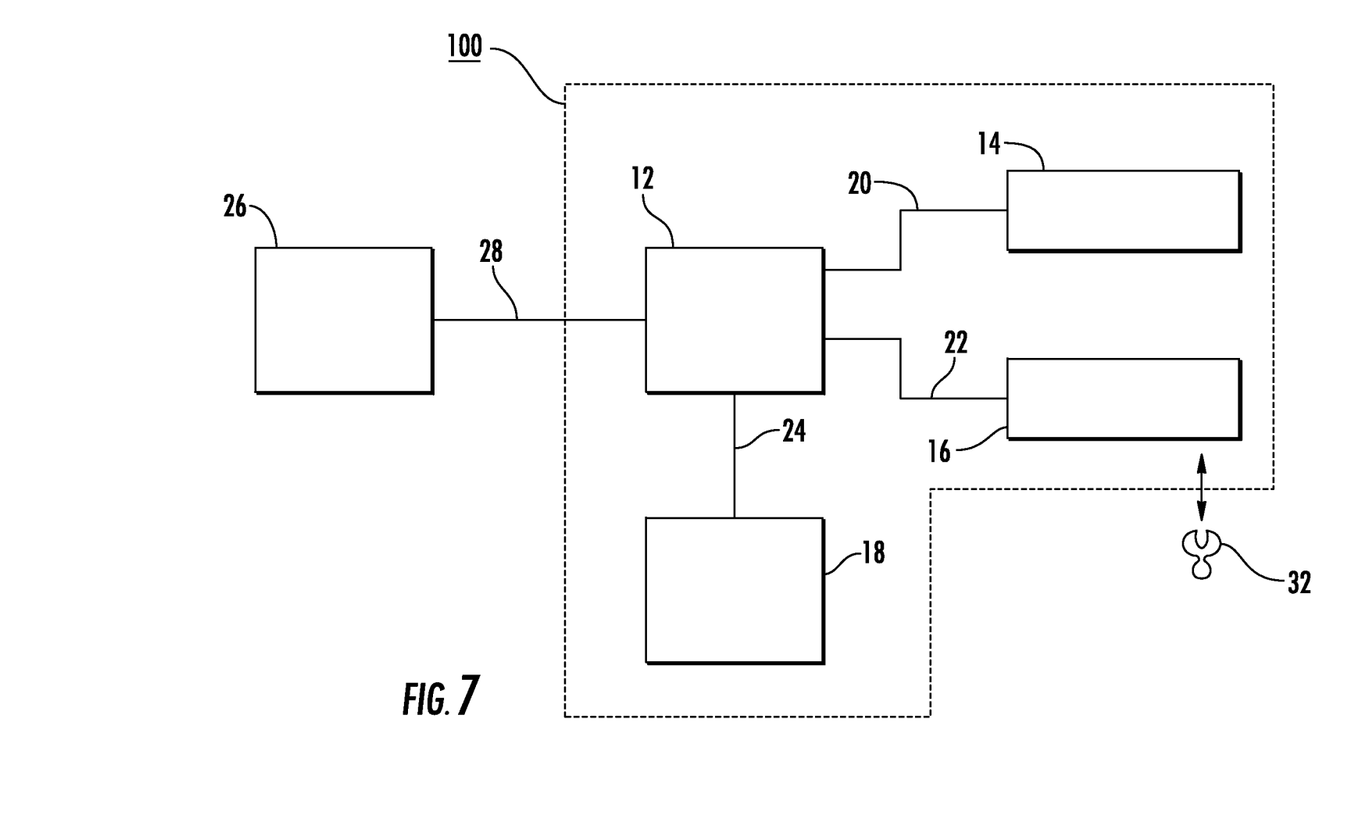
FIG. 7 is a generalized schematic illustration of a eighth embodiment of a FDOCT system, in accordance with the present invention.

FIG. 7 shows a generalized embodiment 100 of a FDOCT system, in accordance with the present invention. The FDOCT 100 includes a signal manipulator 12. The signal manipulator 12 is coupled to a reference portion 14 by a coupler 20, and a sample portion 16 by a coupler 22. The signal manipulator 12 is also coupled to a detector 18 by a coupler 24. The signal manipulator 12 may also be coupled to a source 26 by a coupler 28. The sample portion 16 is coupled 31 to a sample 32.

Examples of signal manipulator 12 of FIG. 7 can include, but are not limited to, the combination of the first optical circulator 34 and the first fiber coupler 36 of FIG. 1, the second fiber coupler 76 and first fiber coupler 36 of FIG. 2, and the first fiber coupler 36 of FIGS. 3 and 4. Additionally, the signal manipulator 12 of FIG. 7 may also correspond to the polarizer 110 and nonpolarizing beam splitter 114 of FIG. 5, and the polarizing element 112 with the fiber coupler 36 of FIG. 6.

The reference portion 14 of FIG. 7 may include, but is not limited to, the combined first polarization controller 42, first phase modulator 44, and reflector 46 of FIGS. 1 and 2. The reference portion 14 of FIG. 7 may also include, but is not limited to, the second phase modulator 84 and third polarization controller 88 of FIG. 3, and the first polarization controller 42 and first phase modulator 44 of FIG. 4. The reference portion 14 of FIG. 7 may also include, but is not limited to, the combination of the $\lambda/n$ plate 116 and reference mirror 118 of FIG. 5, and the first polarization controller 42 and reflector 46 of FIG. 6.

The sample portion 16 of FIG. 7 may include, but is not limited to, the second polarization controller 54, first lens 56, scanning optics 58 and second lens 61 of FIGS. 1, 2, 3 and 6. The sample portion of FIG. 7 may also include, but is not limited to, the combination of the second polarization controller 54, second optical circulator 102, first lens 56, scanning optics 58 and second lens 61 of FIG. 4, and the scanning optics 58 and second lens 61 of FIG. 5.

The detector 18 of FIG. 7 may include, but is not limited to, the first detector 66 and second detector 71 of FIGS. 1 and 2. The detector 18 of FIG. 7 may also include, but is not limited to, the combination of the first and second detectors 66 and 71, and the third fiber coupler 94 of FIG. 3, and the first and second detectors 66 and 71, and the fourth fiber coupler 98 of FIG. 4. Finally, the detector 18 of FIG. 7 may include, but is not limited to, the first and second detectors 66 and 71, the lens 124 and the lens 122, and the polarization beam splitter 120 of FIGS. 5 and 6, as well as the third lens 126 of FIG. 6.

It should also be noted that the source 26 shown in FIG. 7 may include, but is not limited to, the first source 72 of FIGS. 1, 2, 3, 5 and 6. The source 26 of FIG. 7 may also include, but is not limited to, the first source 72 and second source 106 of FIG. 4.

Figure 8:
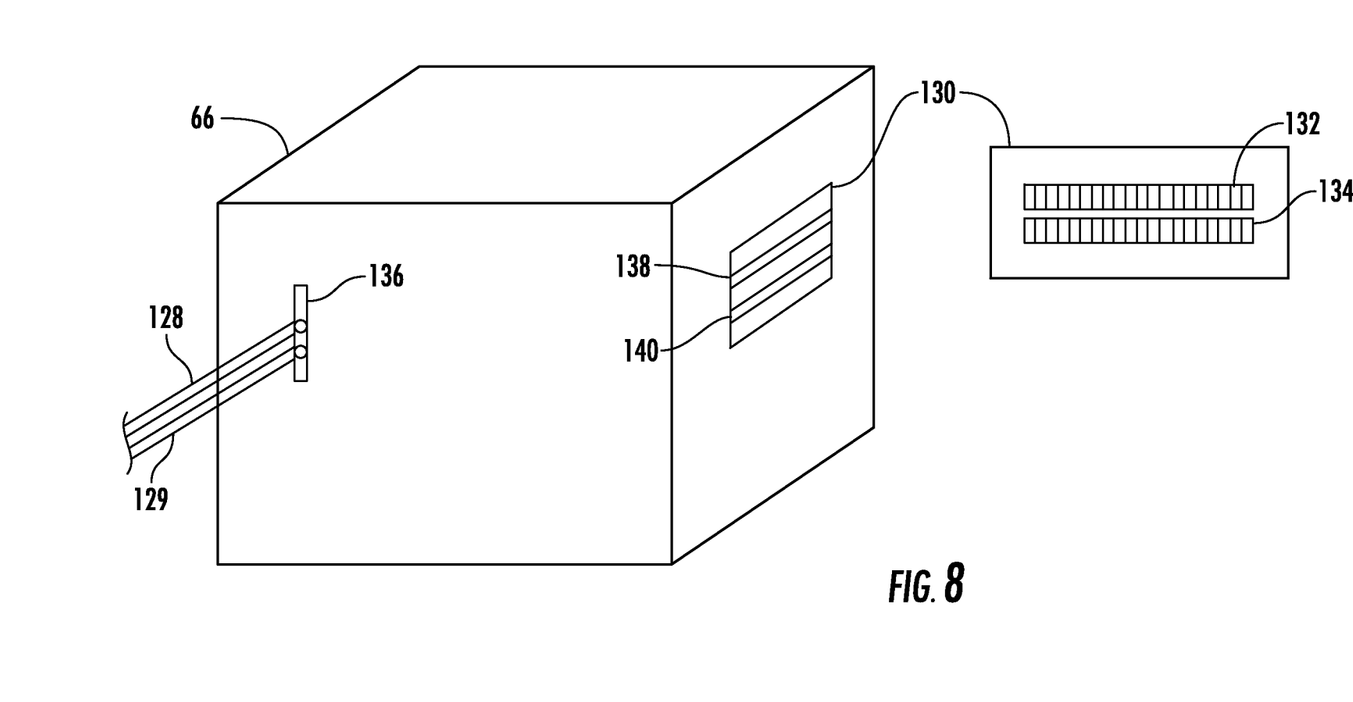
FIG. 8 is a schematic illustration of an imaging spectrometer, in accordance with the present invention.

Referring to FIG. 8, a detector 66 with imaging capabilities suitable for use with FDOCT embodiments 10, 20, 30, 40, 50, 60 and 100 is shown. The detector 66 has dual input fibers 128 and 129 coupled to an input slit 136 of the detector 66. The detector 66 also includes an output area 130. The output area includes a first array 132 and a second array 134 which may receive two spectra, 138 and 140.

In operation, the detector 66 receives two multi-frequency signals carried in the dual input fibers 128 and 129, at the input slit 136. The input signals preferably have a phase difference between them, and the phase difference is preferably 90 degrees. Each input signal is then dispersed according to frequency and the resulting spectra 138 and 140, are directed onto the arrays 132 and 134. The arrays 132 and 134, may then measure power as a function of frequency for each spectrum 138 and 140.

The previously described FDOCT embodiments 10, 20, 30, 40, 50, 60 and 100 all preferably take advantage of the detection of multiple simultaneous optical spectra in the detector arm of the interferometer, corresponding to multiple phase-delayed components of a complex FDOCT signal. FIGS. 1-7 illustrate simple cases of dual-channel detection of spectra separated by orthogonal (90°) or opposite (180°)

phase obtained through the use of intrinsic phase delays associate with interferometer ports, or through polarization multiplexing. A combination of intrinsic and polarization-derived phase delays could also be used to obtain at least four simultaneous phase delays, which would preferably be detected in an equal number of spectral channels. Although four or more simultaneous phase delays may be desirable to accommodate some phase-shift interferometry reconstruction algorithms, collection of two simultaneous phases (optimally separated by 90°) would be one preferred embodiment of the invention, as that would allow for almost complete removal of autocorrelation noise and calculation of complex double-sided spectra with the least complexity and expense.

The light source 72 in the aforementioned embodiments is preferably a low-coherence source. Multiple light sources 72 and 106, may also be used. The spectrometers 66 and 71 used in the FDOCT embodiments should preferably be selected for maximum optical throughput and optimal matching of their dispersion to the spectral content of the low-coherence source, to avoid artifacts associated with the spatial frequency response of the array (i.e., the dispersion should be chosen so that the spectrum nearly fills the detector array). Grating spectrometers currently exhibit the optimal combination of characteristics to satisfy these constraints, however other spectrometer types may be used. If space utilization is not a serious constraint, prism-based spectrometers may give better throughput at the cost of increased required path length.

Preferably, the detector arrays utilized are photodiode arrays with the maximum well depth available, and optimized for response in the wavelength range of the source. Using current detector array technology, this corresponds to the use of silicon photodiode arrays for the popular 830 nm OCT window and for any other desired OCT spectral windows below approximately 1000 nm, and for InGaAs photodiode arrays for the popular 1310 nm OCT window and for any other desired OCT spectral windows in the near-infrared beyond 1000 nm. Charge-coupled device (CCD) arrays may also be used, however current-generation CCDs utilize silicon substrates and may thus be unsuitable for imaging at the popular OCT wavelengths above 1000 nm.

For simplicity, FIGS. 1-7 above illustrate the phase-delayed spectral channels as being dispersed and detected in separate detectors. As shown in FIG. 8, however, the spectrometers and arrays in the detectors shown in each implementation can be replaced by a single imaging spectrometer having a multiple-stripe or two-dimensional detector array, with the input fibers arranged in close vertical proximity to one another so as to have their spectra imaged onto the separate rows (stripes) of the detector array. Such an arrangement would have the significant advantages of allowing for optimal matching of the spectra placed on all channels (since all channels would use the same grating and other spectrometer optics), as well as the cost and space savings achievable by using a single spectrometer. Dual-stripe photodiode arrays have been commercially available in the past, and also three-row CCD arrays designed for 3-color line scanning are currently commercially available. Two of the three rows of a 3-color line scanner array could also be used in place of a dual-row array.

For a preferred embodiment of two FDOCT channels separated by 90° or 180°, a single dual-stripe photodiode array mounted onto an imaging spectrometer would be the preferred detector. Alternatively, a two-dimensional CCD or photodiode array could be used to either a) simulate a dual-stripe array by using the binning capabilities of such an array to collect dual simultaneous spectra, or b) collect more than two simultaneous spectra through an appropriate alternative binning algorithm. However, two-dimensional CCDs still have significant well-depth limitations, and large two-dimensional photodiode arrays are not yet commercially available.

It should be noted that the term "optical circulator" is used herein to mean any type of device capable of directional coupling of electromagnetic radiation incident on port 1 to port 2, while simultaneously coupling electromagnetic radiation incident on port 2 to port 3 Also, as used herein, a "fiber coupler" is used to mean any device which receives an input signal of electromagnetic radiation and divides that signal between two output ports. It should be noted that as used herein, a fiber coupler may have multiple ports wherein each port can serve as an input port for a selected pair of output ports as well as function as an output port for a selected input port. The fiber coupler splitting ratio for all embodiments is ideally 50/50, however this splitting ratio may be modified to account for nonideal performance of other components, for example to compensate for the insertion loss of circulators or other elements. "Polarization controller" is used herein to mean any semiconductor or bulk optical device used to selectively manipulate the polarization of an input signal and output the manipulated signal. "Optical fiber" is used to mean any device or set of devices used to direct electromagnetic radiation along a prescribed path. Thus, "optical fiber" can mean a signal strand of optically transparent material bounded by a region of contrasting index of refraction, as well as mirrors or lenses used to direct electromagnetic radiation along a prescribed path.

As used herein, "phase modulator" means any semiconductor or bulk device used to modulate or otherwise alter the phase of an input electromagnetic signal and output the manipulated electromagnetic signal. "Reflector" is used herein to mean any device capable of reflecting an electromagnetic signal. Thus, "reflector" can be used to mean a mirror, an abrupt transmission in an index of refraction as well as a periodically spaced array structure such as a Bragg reflector. "Scanning optics", means any system configured to sweep an electromagnetic signal across a chosen area.

"Detector" is used herein to mean any device capable of measuring energy in an electromagnetic signal as a function of wavelength. Additionally, "source" is used to mean any source of electromagnetic radiation, and preferably means a low coherence source of electromagnetic radiation.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

That which is claimed is:

1. A multi-frequency interferometric imager, comprising:
    a swept frequency light source configured to generate a narrowband light signal whose frequency is swept as a function of time;
    a light signal manipulator configured to receive the light signal from the swept frequency light source and to output a reference signal and a sample signal;
    a reference arm optical conduit optically coupled to the light signal manipulator to receive the reference signal from the light signal manipulator and to send the reference signal back to the signal manipulator;

a sample arm optical conduit optically coupled to the light signal manipulator to receive the sample signal, the sample arm optical conduit being optically coupled to a sample unit that holds a sample and sends the sample signal back to the signal manipulator;

the signal manipulator being configured to combine the reference signal and the sample signal to output a first signal and a second signal with a first phase difference therebetween and to output a third signal and a fourth signal with a second phase difference therebetween;

first and second single-channel detectors optically coupled to the signal manipulator and configured to receive the first, second, third and fourth signals from the signal manipulator to simultaneously acquire a first spectrum and a second spectrum having the first phase difference therebetween and to simultaneously acquire a third spectrum and a fourth spectrum having the second phase difference therebetween;

a processor configured to determine a first difference spectrum between the first and second spectra, to determine a second difference spectrum between the first and second spectra, the first and second spectra having orthogonal phase to the third and fourth spectra, respectively; to generate a complex Fourier-domain dataset from the first and second difference spectra, wherein the first difference spectrum comprises a real part of the complex Fourier-domain dataset and a second difference spectrum comprises an imaginary part of the complex Fourier-domain dataset; to generate an inverse Fourier transform from the complex Fourier-domain dataset; and to generate an image of at least a portion of a sample based on the inverse Fourier transform, wherein the signal manipulator comprises a first fiber coupler optically coupled to a second fiber coupler and an optical circulator optically coupled to a first fiber coupler;

wherein the reference arm optical conduit and the sample arm optical conduit are each optically coupled to the first fiber coupler so as to receive a signal from the first fiber coupler;

wherein the reference arm optical conduit is configured to receive a signal from the first fiber coupler and output a signal to the second fiber coupler and at least one of the first and second detectors is optically coupled to the first and second fiber coupler so as to receive a signal from the first fiber coupler and a signal from the second fiber coupler, wherein the first and second fiber couplers comprise ports having a predefined phase delay that provide the first phase difference between the first spectrum and the second spectrum and the second phase difference between the third spectrum and the fourth spectrum, such that the first and second spectra have an orthogonal phase to the third and fourth spectra, respectively.

2. The multi-frequency interferometric imager of claim 1, wherein the reference optical conduit comprises a reference optical fiber and the sample optical conduit comprises a sample optical fiber.

3. The multi-frequency interferometric imager of claim 1, wherein the reference arm optical conduit comprises a first phase modulator optically coupled to a first polarization controller.

4. The multi-frequency interferometric imager of claim 1, wherein at least one of the first and second detectors is optically coupled to the second fiber coupler so as to receive a signal from the second fiber coupler.

5. The multi-frequency imager of claim 4, wherein at least one of the first and second detectors is optically coupled to the second fiber coupler so as to receive the first signal and the second signal from the second fiber coupler.

6. The multi-frequency interferometric imager of claim 1, wherein the first detector is optically coupled to the first fiber coupler so as to receive a signal from the first fiber coupler and the second detector is optically coupled to the optical circulator so as to receive a signal from the optical circulator.

7. The multi-frequency interferometric imager of claim 1, wherein the signal manipulator comprises a first fiber coupler optically coupled to a second fiber coupler.

8. The multi-frequency interferometric imager of claim 7, wherein the reference arm optical conduit and the sample arm optical conduit are optically coupled to the first fiber coupler.

9. The multi-frequency interferometric imager of claim 8, wherein at least one of the first and second detectors are optically coupled to the first fiber coupler and the second fiber coupler so as to receive a signal from the first fiber coupler and the second fiber coupler.

10. The multi-frequency interferometric imager of claim 9, wherein the first detector is configured to receive a signal from the first fiber coupler and the second detector is configured to receive a signal from the second fiber coupler.

11. The multi-frequency interferometric imager of claim 1, wherein the signal manipulator comprises a first fiber coupler.

12. The multi-frequency interferometric imager of claim 11, wherein the sample arm optical conduit comprises: a first polarization controller; and an optical circulator optically coupled to the first polarization controller.

13. The multi-frequency interferometric imager of claim 12, further comprising a second fiber coupler, and first and second detectors configured to receive signals from the second fiber coupler.

14. The multi-frequency interferometric imager of claim 13, wherein the reference arm optical conduit and the sample arm optical conduit are coupled to the second fiber coupler.

15. The multi-frequency interferometric imager of claim 1, wherein the signal manipulator comprises: a polarizer; and a non-polarizing beam splitter optically coupled to the polarizer.

16. The multi-frequency interferometric imager of claim 15, wherein the reference arm optical conduit comprises: a wave plate; and a reference delay unit optically coupled to the wave plate.

17. The multi-frequency interferometric imager of claim 16, wherein the sample arm optical conduit comprises scanning optics optically coupled to a sample.

18. The multi-frequency interferometric imager of claim 17, further comprising a polarizing beam splitter optically coupled to first and second lenses, wherein the first detector is configured to be optically coupled to the first lens, and the second detector is configured to be optically coupled to the second lens.

19. The multi-frequency interferometric imager of claim 1, wherein the signal manipulator comprises a polarizing element configured to be optically coupled to a fiber coupler.

20. The multi-frequency interferometric imager of claim 19, wherein the reference arm optical conduit and the sample arm optical conduit are optically coupled to the fiber coupler.

21. The multi-frequency interferometric imager of claim 20, further comprising: first and second lenses optically coupled to a polarizing beam splitter, wherein the first detector is coupled to the first lens; and the second detector is coupled to the second lens.

\* \* \* \* \*